United States Patent [19]

Bevan

[11] Patent Number: 5,646,854
[45] Date of Patent: Jul. 8, 1997

[54] LATERAL GUIDANCE TRANSITION CONTROL APPARATUS FOR AIRCRAFT AREA NAVIGATION SYSTEMS

[75] Inventor: Erik Thane Bevan, Glendale, Ariz.

[73] Assignee: Honeywell Inc., Minneapolis, Minn.

[21] Appl. No.: 436,501

[22] Filed: Nov. 14, 1989

[51] Int. Cl.$^6$ .................................................. G01C 21/00
[52] U.S. Cl. .......................... 364/448; 364/447; 364/439; 244/193
[58] Field of Search ....................... 364/448, 447, 364/439, 434, 433, 444, 462; 244/193, 181, 184, 185, 186, 188

[56] References Cited

U.S. PATENT DOCUMENTS

| 3,355,126 | 11/1967 | Oppedahl | 364/462 X |
|---|---|---|---|
| 3,980,258 | 9/1976 | Simeon | 364/448 X |
| 3,994,456 | 11/1976 | Post et al. | 364/448 |
| 3,998,412 | 12/1976 | Baker et al. | 364/448 X |
| 4,021,099 | 5/1977 | Baker et al. | 244/186 X |
| 4,354,240 | 10/1982 | Olive | 364/447 X |

*Primary Examiner*—David C. Cain
*Attorney, Agent, or Firm*—Arnold L. Albin; Brian C. Downs; Ronald E. Champion

[57] ABSTRACT

An apparatus for providing lateral guidance through a plurality of waypoints utilizing curved path transitions. When the curved path transitions overlap due to a short leg there is a discontinuity in the desired path of the aircraft, causing the aircraft to experience excessive and oscillatory bank angles to maneuver through the turn. The invention adjusts the transition parameters so that there are no discontinuities in the flight path by computing a new turn radius, turn center, or turn center coordinates, in accordance with the course through the waypoints. The invention determines which flight plan legs are short and calculates the parameters so that the path will not violate air space boundaries and bank angles will be minimized. A circular path is generated tangential to course changes in the same or opposite direction, irrespective of the value of the flight plan leg length.

15 Claims, 7 Drawing Sheets

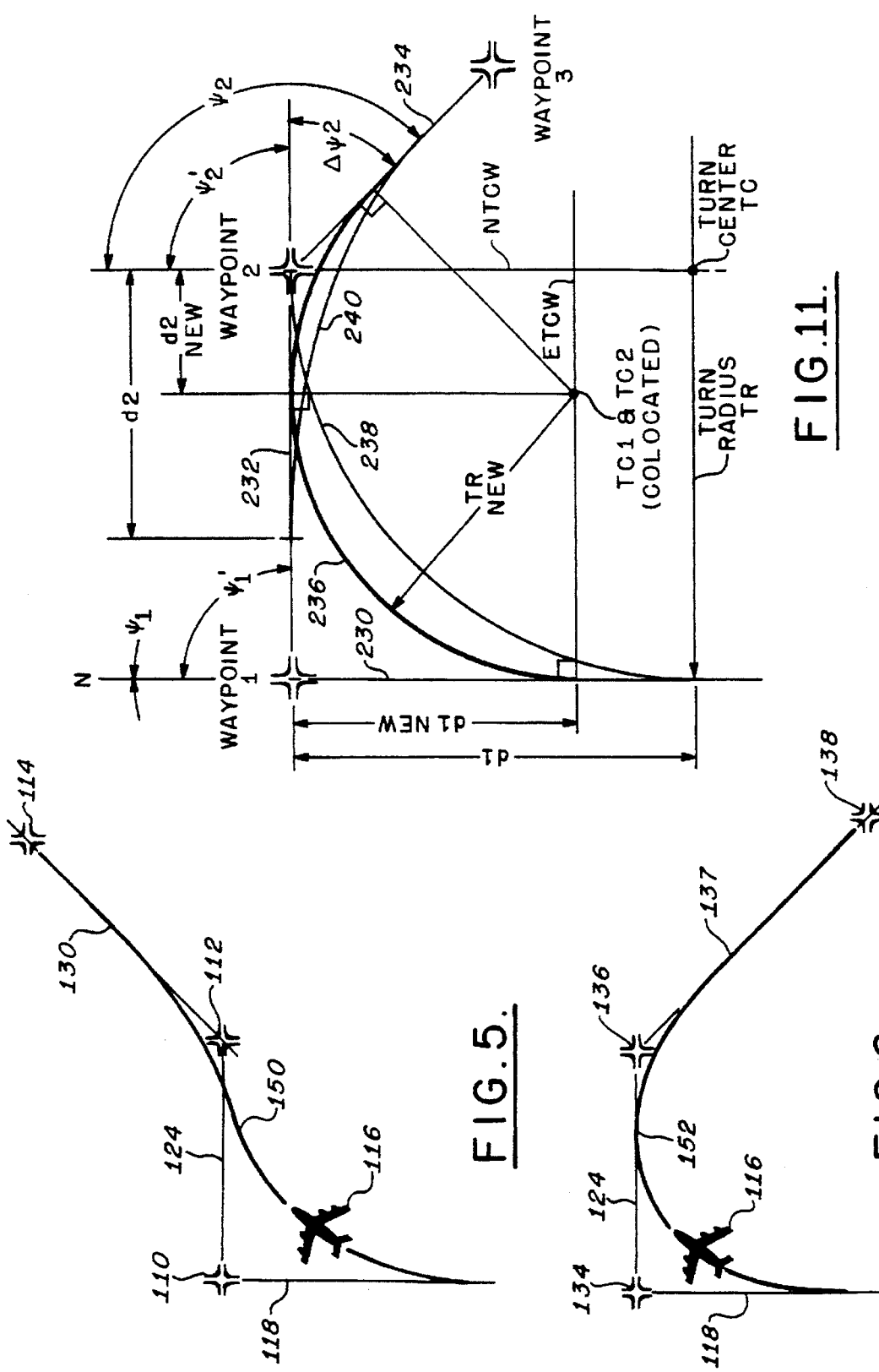

LATERAL GUIDANCE TRANSITION CONTROL APPARATUS FOR AIRCRAFT AREA NAVIGATION SYSTEMS

BACKGROUND OF THE INVENTION

1. Field of the Invention

The invention relates to flight management systems for an aircraft and more specifically to lateral guidance in area navigation systems.

2. Description of the Prior Art

Aircraft area navigation systems in which a navigation computer guides an aircraft along a flight plan through a series of point-to-point transitions from an inbound course or leg of a waypoint to the next leg or outbound course thereof are known in the prior art. In U.S. Pat. No. 3,994,456, issued Nov. 30, 1976 to William C.; Post and Edmond E. Olive, entitled "Steered Lateral Course Transition Control Apparatus for Aircraft Area Navigation Systems," assigned to the assignee of the present invention, an area navigation system controlled the aircraft to follow a circular transition path from a first straight line course to a second straight line course through predetermined waypoints. An alternative prior art transition control apparatus may be found in U.S. Pat. No. 4,354,240, issued Oct. 12, 1982 to Edmond E. Olive, entitled "Flight Path Transition Control Apparatus with Predictive Roll Command," also assigned to the assignee of the present invention. In this area navigation system the transition control apparatus executes an exponential transition path from a first course to a second course, thereby avoiding undesirable overshoot of the new course experienced in the aforesaid Post, et al patent.

The above described transition methods do not preclude the aircraft from violating airway boundaries and may result in excessive oscillatory motions resulting in passenger discomfort. The Federal Aviation Administration (FAA) specifies a route width of protected airspace that cannot be violated while navigating along the flight plan. Typically the specified route width is four nautical miles on each side of the leg en route, and two nautical miles on each side of the leg in terminal areas. In the controlled environment of present air traffic, most flight plans consist of several legs or segments starting at the origin of the flight and ending at the destination of the flight plan. In order for the aircraft to fly from the origin to the destination it is necessary for the aircraft to steer from the first track to the next at a predetermined distance from the way point and permit steering signals to capture the next leg by either manual pilot control through the flight director or by applying the steering signals to the automatic flight control system, as programmed by the flight management system. The current method of transitioning between legs uses curved paths which are tangent to both of the adjoining legs. This transition method is defined in the above cited U.S. Patents.

When a leg of a flight plan is short enough so that these curved path transitions overlap, there may occur a discontinuity in the desired path of the aircraft. FIG. 1 shows a typical flight plan, wherein the aircraft is transitioning between first, second, and third waypoints 110, 112 and 114. An aircraft 116 initially approaches a northerly oriented course 118 and at point 120 enters a circular flight path 122 which is tangential to the course 118. This circular flight path results in a tangential intersection with the easterly course 124 at waypoint 112. In accordance with the prior art, a further circular path 126 for transitioning between waypoints 110 and 114 is tangent to the easterly course 124 at a point 128 and to a northeasterly course 130 at point 132. It may be seen that the two flight paths 122 and 126 do not intersect and therefore the aircraft is caused to use excessive and oscillatory bank angles to maneuver through the turn at waypoint 112. This problem of the "short leg" (i.e., the distance between waypoints 110 and 112) is not recognized by the prior art. While FIG. 1 refers to a flight plan wherein the aircraft transitions through two opposing turns, FIG. 2 shows a similar problem where the flight path is in the same general direction through waypoints 134, 136, and 138. Here the aircraft 116 enters a first circular path 140 between the northerly course 118 and the easterly course 24 and is required to transition between waypoints 134 and 138 through waypoint 136. Again, leg 135 is too short to permit a smooth transition between flight paths 140 and 142 resulting in a discontinuity on the short leg.

In FIG. 3 and FIG. 4 the solution conventionally applied to the above problem by the prior art navigation systems is shown for the cases of the opposite direction and same direction course changes, respectively. In flight path 144 the short leg 124 is effectively deleted and the aircraft flies the most direct route to the leg following the short leg. This then requires open loop capture to the following leg in which control is referenced to the leg 118 preceeding the short leg 124 and then referenced to the leg 130 following the short leg but is never referenced to the short leg. Similarly, control is referenced from leg 118 in FIG. 4 to leg 137 without referencing to the short leg 135. Thus, this method imposes an extra work load on the pilot and because the aircraft is in open loop control during the transition through the short leg, the aircraft may violate airway boundaries prescribed by the FAA. In particular geometries with large course changes, deleting the short leg can result in turns in the wrong direction. Further, because there is a discontinuity in the defined flight plan, the resulting bank angles may be excessive and oscillatory.

The present invention provides an apparatus for transitioning on and off of the short leg that maintains the aircraft in protected air space, minimizes the bank angle for passenger comfort, keeps the bank angle from oscillating, and enables the pilot to maintain cognizance of the aircraft position throughout the flight plan. The invention does not delete the short leg, so that the sequencing looks normal to the pilot on his flight instruments. The invention determines which flight plan legs are short and then recalculates the transition parameters so that there are no discontinuities in the flight path. The invention uses curved path transitions which are geometrically based and guaranteed to be within the airway boundaries. The commanded turns will always be in the correct direction.

SUMMARY OF THE INVENTION

The invention comprises an apparatus for transitioning an aircraft from an inbound course to an outbound course through a plurality of waypoints and includes curved path means for computing a circular path from the inbound course to the outbound course tangentially thereto and provides a predetermined turn radius. It comprises:

path direction means responsive to a source of waypoint data for generating a control signal representative of a direction of the outbound course with respect to the inbound course, and first path generation means responsive to a first state of the control signal corresponding to the same direction of the inbound and outbound course changes, for generating a further turn radius for the circular path, a turn center coordinate for the circular path, and a predetermined distance representative of the length from the point of tangency of the inbound course to a first waypoint, such that the circular path is tangential to the inbound and outbound courses irrespective of the distance between first and second waypoints defining a leg length.

It further comprises a second path generation means responsive to a second state of the control signal which corresponds to an opposing direction of the inbound and outbound course changes for generating at least first and second turn center coordinate signals such that the circular path is tangential to the inbound and outbound courses irrespective of the value of the leg length.

In the preferred embodiment when traversing course changes in the same direction the invention provides a new turn radius and turn center such that a curved flight path is provided which is tangential to both the inbound and outbound courses. It further permits recalculating the distance from the point of tangency along the inbound course. When flying course changes in opposing directions, the invention maintains the predetermined turn radius but relocates one of the turn centers such that the curved paths followed along the inbound and outbound courses are substantially tangential thereby providing a smooth transition through an intermediate waypoint.

BRIEF DESCRIPTION OF THE DRAWINGS

FIG. 5 and FIG. 6 are diagrams illustrating the desired path actually followed utilizing the present invention in a short leg encounter.

FIG. 11 is a diagram illustrating geometrical parameters with regard to the curved transition path from an inbound course to an outbound course through a plurality of waypoints for a flight path in the same direction as in the present invention.

DESCRIPTION OF THE PREFERRED EMBODIMENTS

Figure 3:
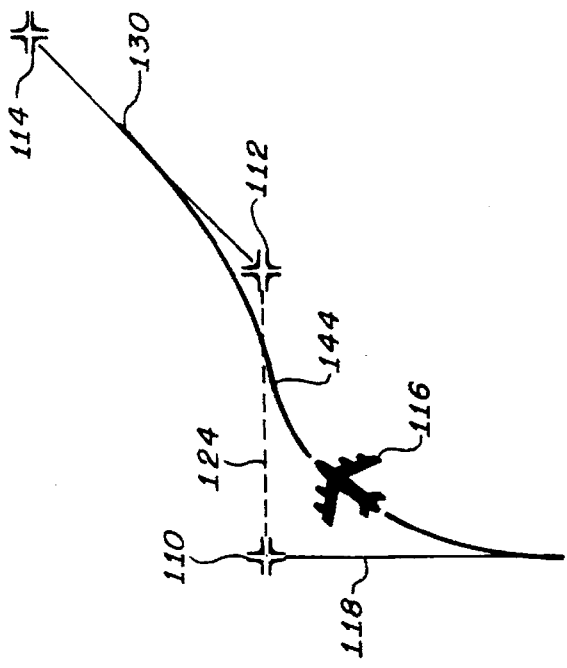
FIG. 3 is a diagram illustrating the path actually followed by the prior art for course changes in opposing directions.
Figure 4:
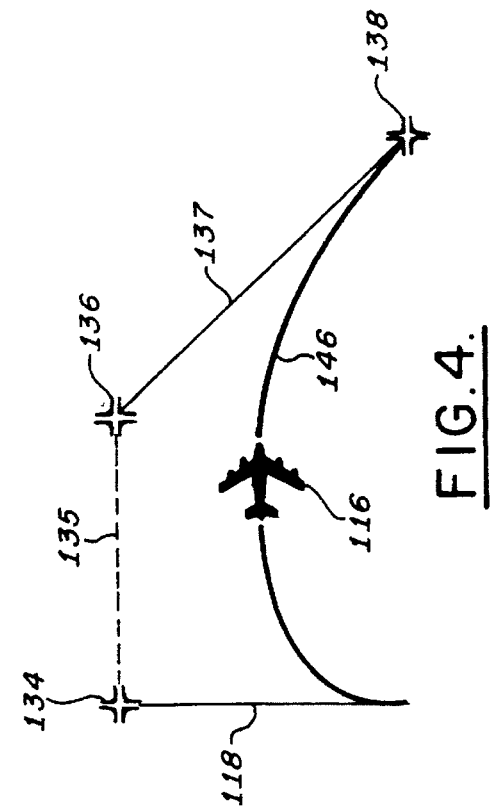
FIG. 4 is a diagram similar to FIG. 3 for a flight path having course changes in the same direction in the prior art.
Figure 1:
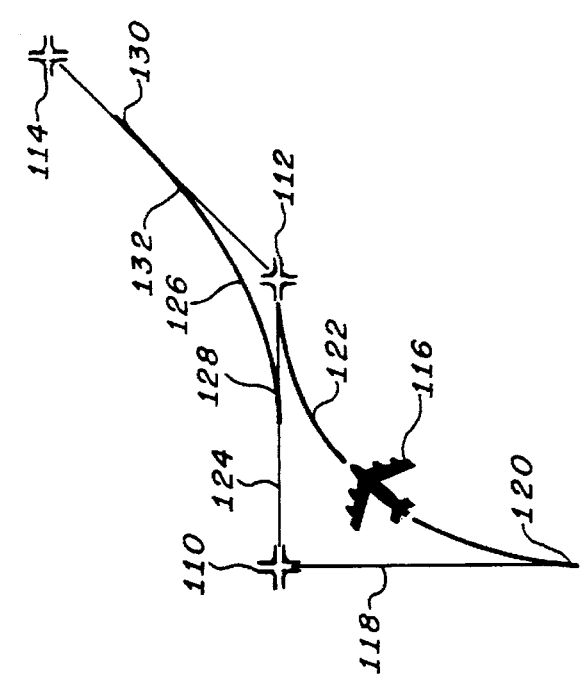
FIG. 1 is a diagram illustrating the computed circular flight path utilizing prior art transition control apparatus for course changes in opposing directions in a short leg encounter.
Figure 2:
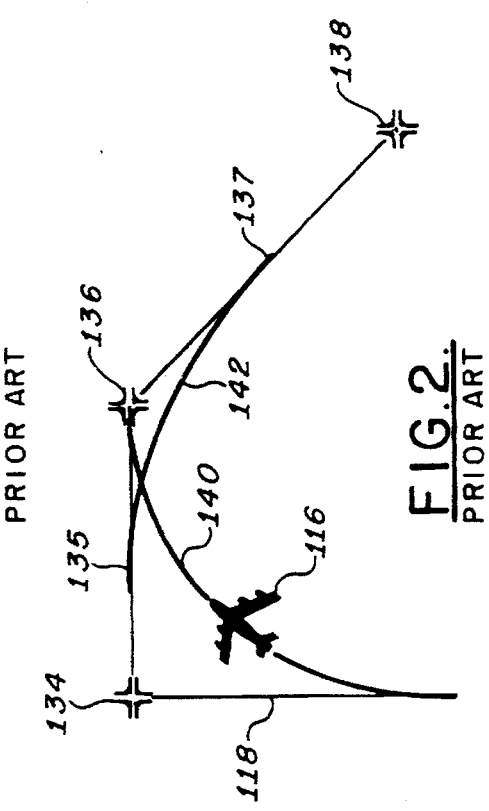
FIG. 2 is a diagram similar to FIG. 1 illustrating the flight path followed by the prior art apparatus for course changes in the same direction.

Referring to FIG. 5, the geometry of the situation is depicted where with the aircraft flying along a present course 118 it is desired to execute a transition to and capture a new course 130 through a short leg 124. A desired tangential path to courses 118 and 130 is illustrated by the flight path 150. FIG. 6 shows the geometry of the situation where the aircraft is flying along a present course 118 and it is desired to execute a transition through course 124 to 137 in the same direction to capture a path 152 which is tangential to courses 118, 124 and 137.

Figure 7:
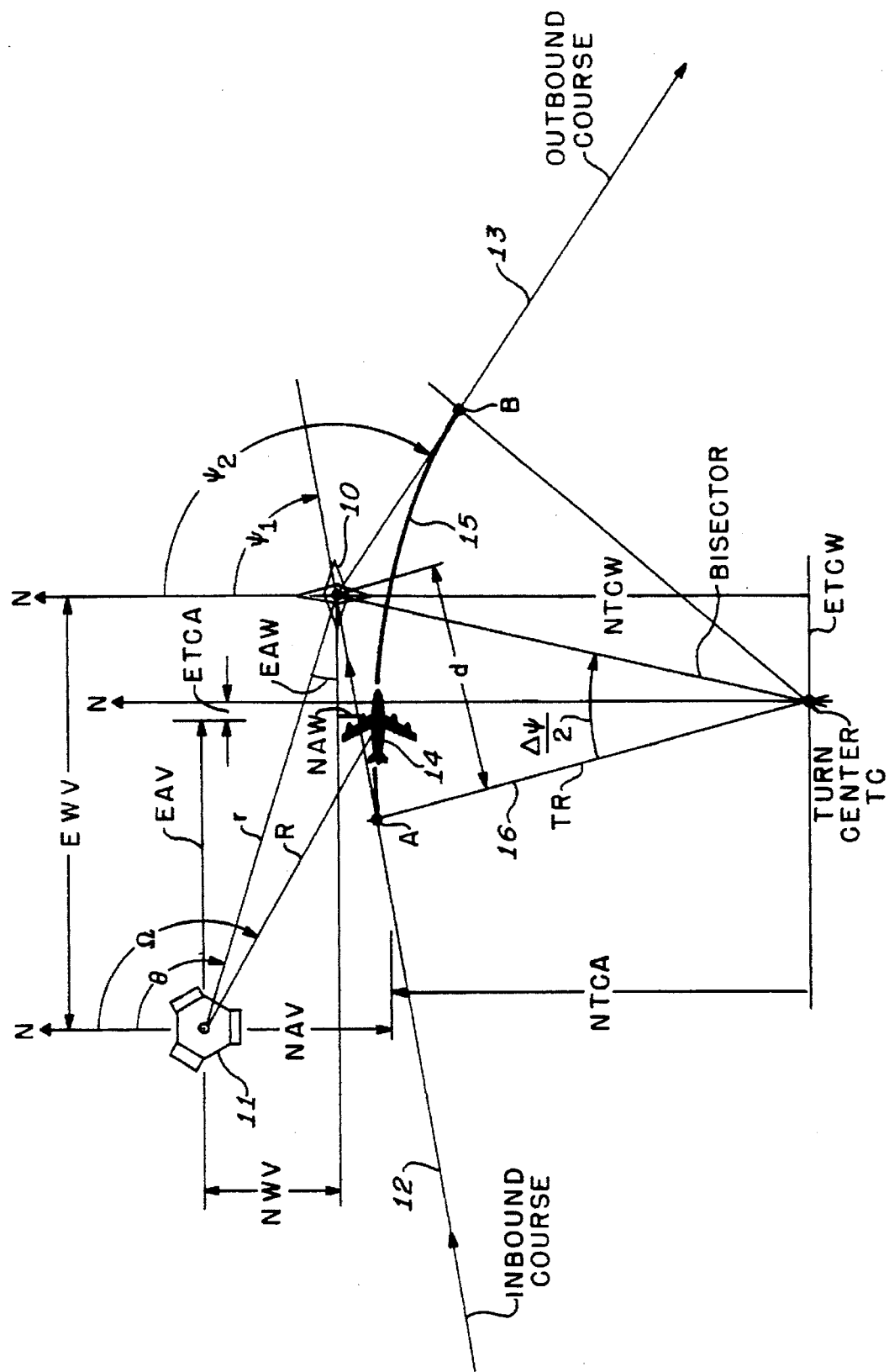
FIG. 7 is a diagram illustrating geometrical parameters with respect to the curved transition path from an inbound course to an outbound course at a waypoint.

Referring now to FIG. 7, the lateral navigation parameters associated with transitioning from the inbound course to the outbound course of a waypoint is illustrated. A waypoint 10 whose geographical location is determined in a well known manner by the r,θ coordinates with respect to a VORTAC 11 or from manually entered pilot coordinates has an inbound course 12 and an outbound course 13 associated therewith. The inbound and outbound courses 12 and 13 with respect to north are designated as $\psi_1$ and $\psi_2$ respectively. An aircraft 14 flies a curved path 15 which is generated by the invention to effect a smooth and controlled transition from the inbound course 12 to the outbound course 13 preferably the curved path 15 is circular and tangential to the inbound and outbound courses at points A and B respectively. A turning radius 16 for the curved path 15 is established in accordance with a predetermined maximum bank angle and the aircraft ground speed. A distance d is then determined which locates the point A on the inbound course 12 and in combination with the turn radius 16 locates the turn center TC for the curved path 15. The north and east components of the turn center TC with respect to the waypoint 10 are designated as NTCW and ETCW respectively.

Figure 8:
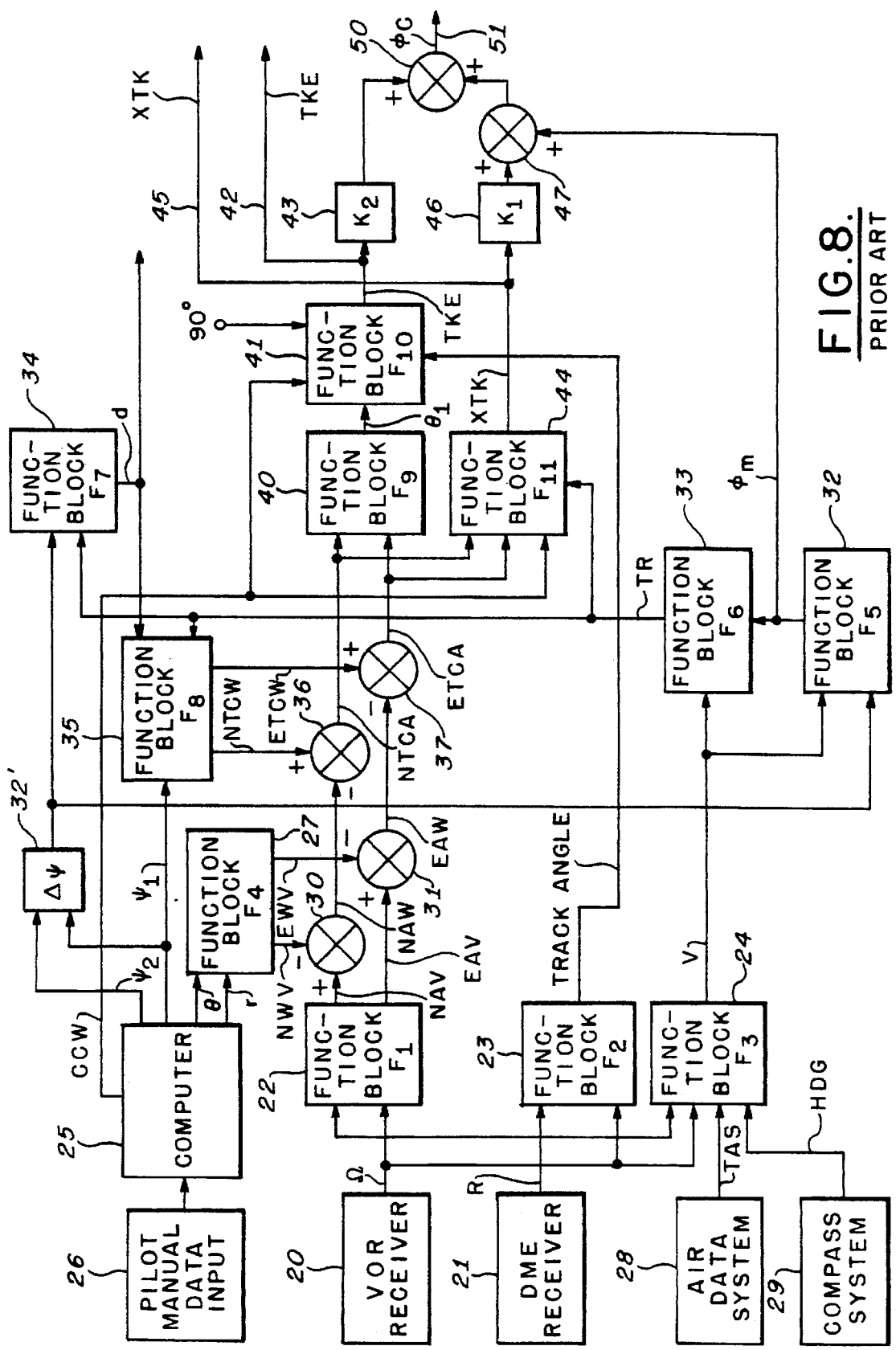
FIG. 8 is a schematic block diagram of curved transition path generation and control apparatus for an aircraft area navigation system instrumented in accordance with the prior art.

Referring to FIG. 8 a schematic block diagram of apparatus for generating the curved path 15 and for controlling the aircraft 14 to fly along in transitioning from the inbound course 12 to the outbound course 13 of the waypoint 10 is illustrated in accordance with U.S. Pat. No. 3,994,456 which is hereby incorporated by reference. The apparatus of FIG. 8 includes a plurality of function blocks that may be implemented by any variety of well known devices such as special purpose discrete analog or digital circuits or alternatively may be implemented by the computation apparatus of a flight management system. Circuits for providing the functions described therein are either well known in the art or described in detail in the patent and will not be described further herein for brevity, except as required for utilization with the embodiment of the present invention.

In particular, the apparatus of FIG. 8 includes a pilot manual data input device 26 by which the pilot may alter the data stored in computer 25 or may enter new data therein, such as waypoint data for a flight plan. The device 26 may be utilized, for example, when the pilot wishes to deviate from the flight plan as stored in the computer 25. Computer 25 stores the navigational data with regard to the flight plan of the aircraft. For example, the computer 25 may be preloaded prior to a particular flight with the geographical locations of all of the waypoints along the flight plan as well as the locations of the associated VORTACs. The computer is arranged in a conventional manner to provide the required data as the aircraft executes the flight plan with regard to the sequentially encountered waypoints. For example, referring again to FIG. 7, with the aircraft on the inbound course 12 of the waypoint 10, the computer 25 provides the pre-stored inbound and outbound courses $\psi_1$ and $\psi_2$ respectively for the waypoint 10 as well as the bearing θ and distance γ of the waypoint 10 with respect to the VORTAC 11. The computer 25 also provides a control signal CCW in accordance whether the turn from the inbound course 12 to the outbound course 13 is clockwise or counterclockwise. A bank angle signal $\phi_m$, from function block 32 and ground speed signal V from function block 24 are applied to a function block 33 to generate the turn radius TR (16, FIG. 7) for the circular path 15. Function block 32' generates a course difference signal $\Delta\psi$ which is representative of the track change $\psi_2-\psi_1$ and is derived from the inbound and outbound courses $\psi_1$ and $\psi_2$ from the computer 25.

The $\Delta\psi$ signal from the function block 32' and the turn radius signal TR from the function block 33 are applied to a function block 34 to generate a signal d in accordance with the distance between the point A and the waypoint 10 of FIG. 7. The distance d is generated in accordance with a function block F7 as described in the aforesaid patent. Further, the $\psi_1$ signal from the computer 25, the turn radius signal TR from the function block 33 and the d signal from the function block 34 are applied to a function block 35 to generate the north and east coordinates of the turn center location with respect to the waypoint 10, denoted as NTCW and ETCW respectively.

Figure 9:
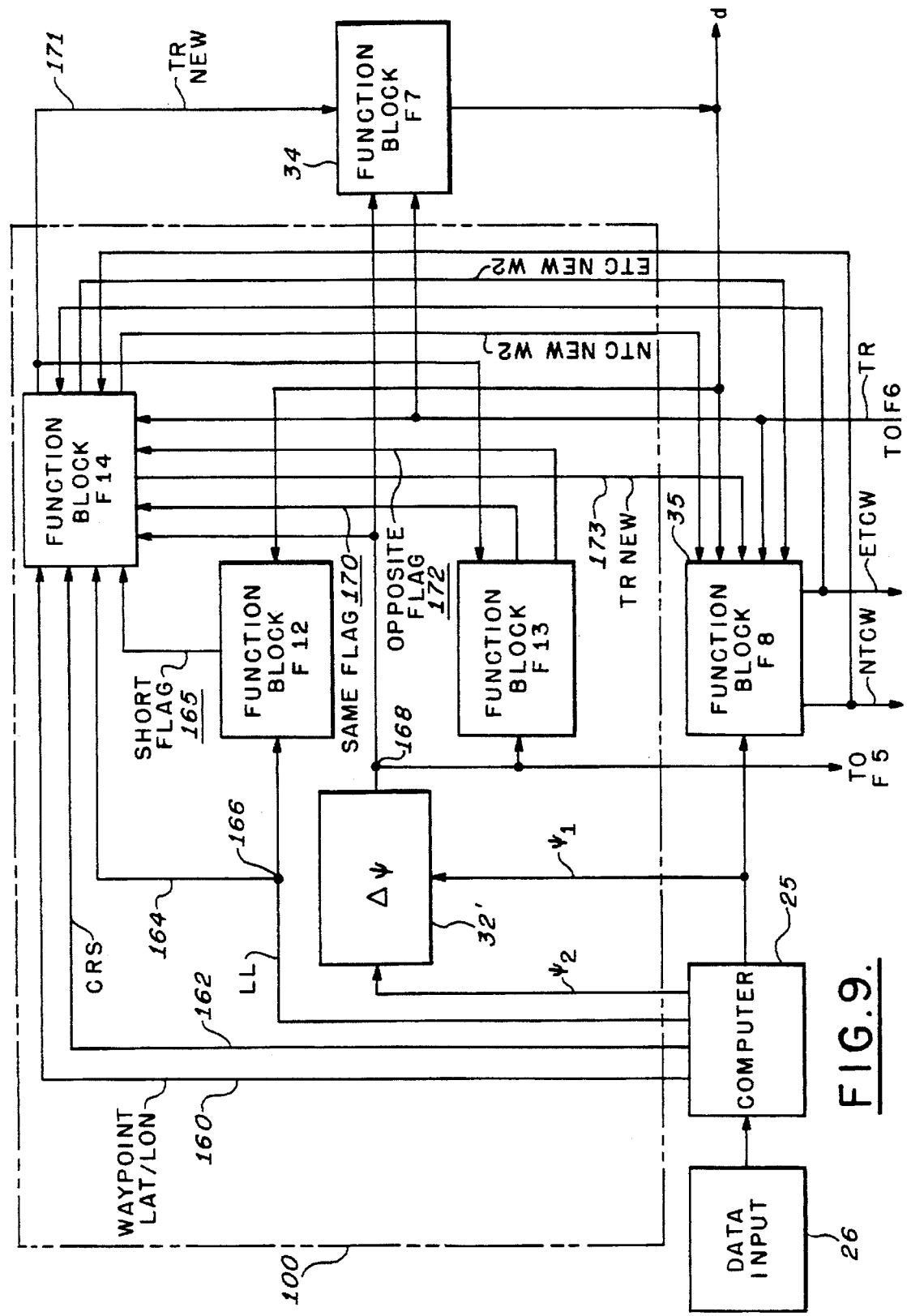
FIG. 9 is a schematic block diagram of curved transition path generation and control apparatus instrumented for utilization in accordance with the present invention.

Referring now to FIG. 9, there is shown a schematic block diagram of curved transition path generation and control apparatus for an aircraft area navigation system instrumented in accordance with the present invention. Computer 25, data input 26, and function blocks 34, 35 and 32' operate as described with respect to FIG. 8 and form no part of the present invention. However, these elements are deemed necessary for clarity to show how the present invention is adapted to the prior art. The invention adds function blocks F12, F13 and F14 to the above referenced patent. The input and output parameters are as shown in FIG. 9. Thus, waypoint data either stored in the computer 25 or entered manually by the pilot from data input 26 are utilized to compute the distance between the waypoints. Computer 25 generates the latitude and longitude of the waypoints on lead 160. The geographical location of the waypoints may be determined from a predetermined knowledge of the course or with respect to the known location of the VORTAC 11. Latitude and longitude are determined for each of the waypoints along the flight plan. The computer also provides the courses (CRS) of the inbound and outbound courses of the waypoint to waypoint legs on lead 162. The waypoint latitude and longitude and course signals are applied to function block F14 which functions in a manner to be described. A signal LL which is representative of the leg lengths or distance between the waypoints is computed by computer 25 and applied on lead 164 to function block F14. Signal LL is also applied through node 166 to a function block F12. Signal d from function block 7 is also applied to function block F12. Function block F12 uses the following logic to determine if the leg is short:

If $LL<d1+d2$, $LL=short$ (1)

where d1=distance from tangent to short leg on entry waypoint, d2=distance from tangent on short leg to end of short leg on exit.

If the leg is short, function block 12 outputs the "short" flag 165 to function block F14. If the leg is not short, then function block F12 is quiescent.

Block 32' computes the change in course $\psi_1$ for a transition at the beginning of the short leg and $\Delta\psi_2$ for a transition at the end of the short leg. Thus, as shown in FIG. 9, $\Delta\psi$ would be the difference of $\psi_2-\psi_1$. The computer 25 sequentially applies the corresponding course angles to function block 32' as the aircraft approaches each waypoint. The output signal from block 32' is applied to node 168 and then to function block F13 which applies the following logic to determine whether the course changes are in the same or in an opposite direction:

If $\Delta\psi_2 * \Delta\psi_2$ greater than 0 (2)

then course changes are in the same direction and function block F13 outputs a "same" flag 170 to function block F14.

Else course changes are in opposite direction and function block F13 outputs the "opposite" flag 172 to function block F14.

When enabled by the simultaneous application of the short flag from function block F12 and the same flag from function block F13, then function block F14 computes a new turn radius TRNEW which is applied to function blocks 34 and 35 as follows:

$$TRNEW = \frac{LL}{|\tan\Delta\phi_1 + \tan\Delta\phi_2|} \quad (3)$$

If the short flag from function block F12 and the opposite flag from function block F13 are applied to function block F14 then function block F14 uses waypoint latitude, longitude, and course from the computer 25, original turn radius TR from function block F6, the north and east coordinates of the turn center location with respect to the waypoint, NTCW and ETCW, and the following equations to generate new turn center coordinates with respect to the waypoint NTCNEWW2 and ETCNEWW2 which are applied to function block F8.

TC1 latitude = Waypoint1 latitude + NTCW1
TC1 longitude = Waypoint1 longitude + ETCW1
TC2 latitude = Waypoint2 latitude + NTCW2
TC2 longitude = Waypoint 2 longitude + ETW2

DTC1TC2 = {[(TC1lat − TClat)(ERADIUS)]**2 +
[(TC1lon − TC2lon)(ERADIUS)(cosTC1lat)]2}1/2

$ATC1TC2 = \arctan \frac{(TC1lon - TC2lon)(ERADIUS)(cosTC1lat)}{(TC1lat - Tc2lat)(ERADIUS)}$ where ERADIUS is the radius of the earth OUTCR2 = course out of waypoint2

$TC2MOVEDIST = \frac{DTC1TC2 - (TR1 + TR2)}{\cos(ATC1TC2 - OUTCRS2)}$

NTC2TC2NEW = TC2MOVEDIST[cos(OUTCRS2 − 180)

NTC2TC2NEW = TC2MOVEDIST[sin(OUTCRS2 − 180)

NTCNEWW2 = NTCW2 + NTC2TC2NEW

ETCNEWW2 = ETCW2 + ETC2TC2NEW

In the above equations, a '1' means that the variable applies to the transition at the beginning of the short leg, and a '2' means that the variable applies to the transition at the end of the short leg.

Function blocks F12, F13, and F14 may be implemented by using conventional analog circuitry and computational techniques or by using conventional wholely digital techniques or by using conventional hybrid digital/analog techniques. To simplify the understanding of the invention, it has been explained by using a generally analog format as shown in FIG. 9 it being understood that the same analog format may also represent, in block diagram form, the program of a programable digital computer wherein the various analog inputs are converted to digital signals for digital processing and the various digital outputs are converted to analog signals for driving the control surface servo motors and the like.

Figure 10:
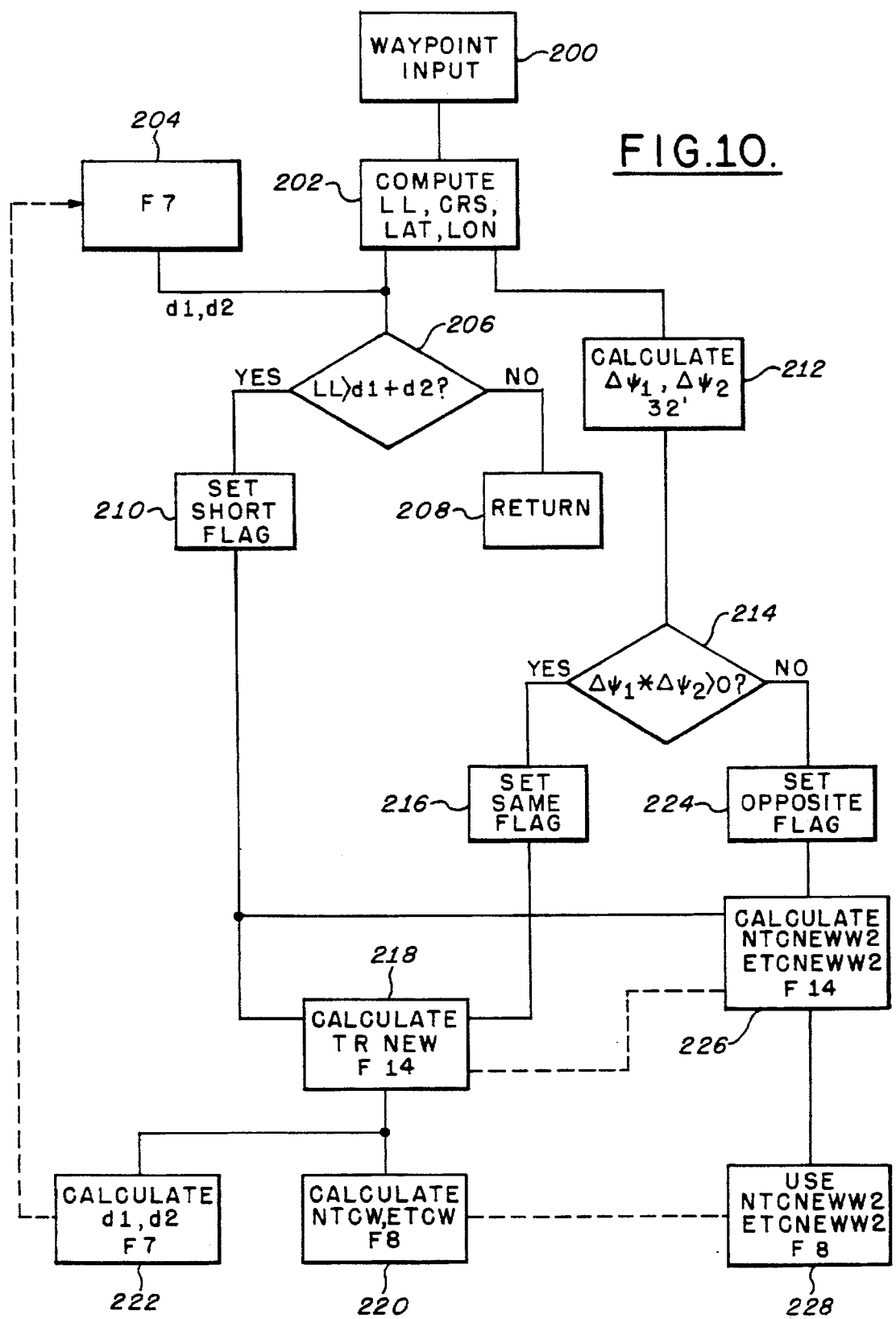
FIG. 10 is a flow chart depicting the functional relationship of the various elements schematically depicted in FIG. 9.
Figure 12:
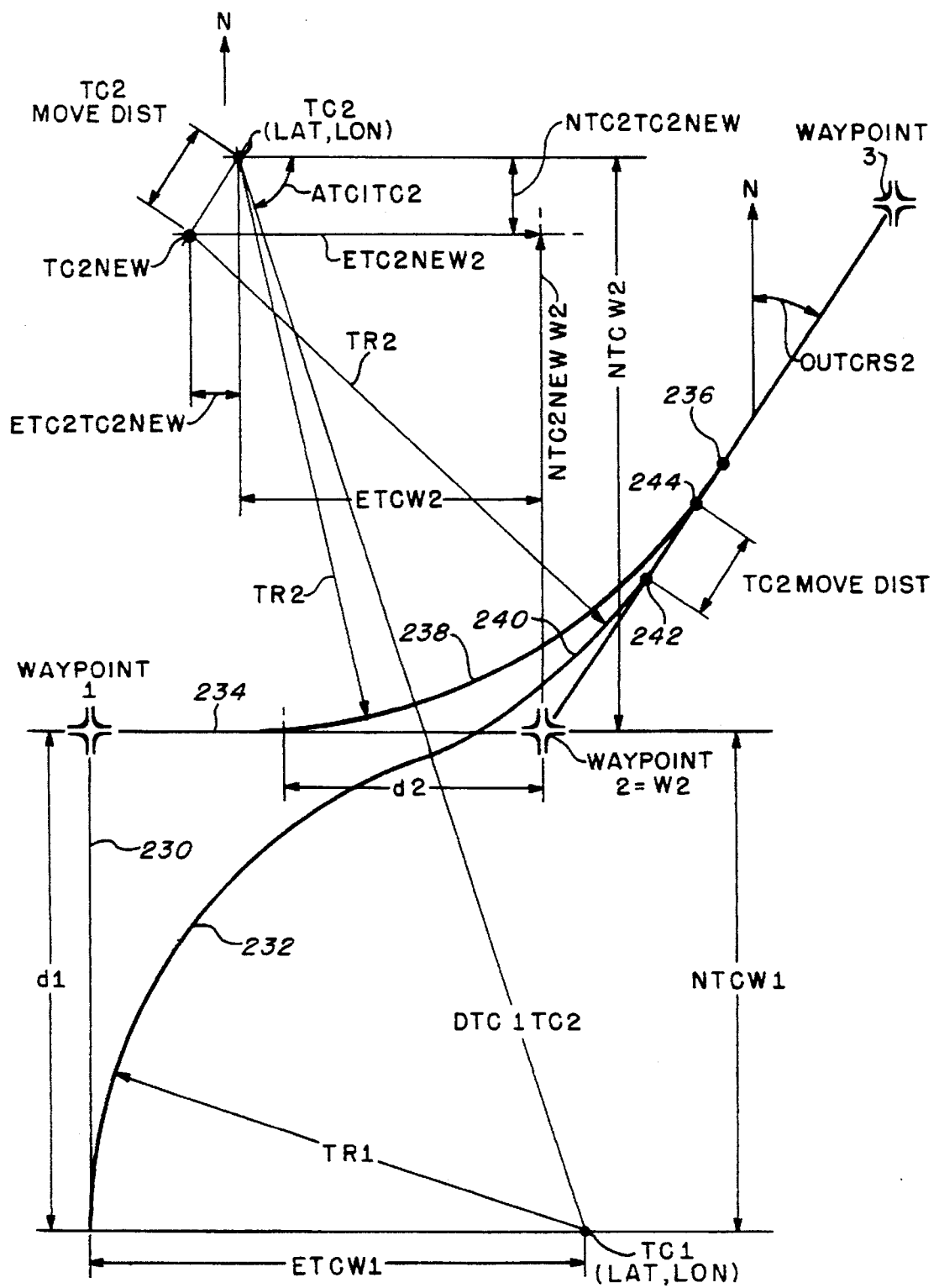
FIG. 12 is a diagram similar to FIG. 11 illustrating the geometrical parameters in the present invention for a flight path having course changes in opposing directions.

Referring now to FIG. 10 the operation of the system is described with respect to the flow chart depicted therein. Waypoint input data are manually entered by the pilot in block 200 to computer 202 where, alternatively, waypoint data may have been prestored. Computer 202 then calculates the distance LL between the waypoints, the courses CRS of the waypoint to waypoint legs, and latitude lat1, lat2 and longitude lon1, lon2 of the waypoints. Function block F7 computes the distance from d1, d2 from the point of tangency to the waypoint, where the number "1" means that the variable applies to the transition at the beginning of the short leg and a "2" means that the variable applies to the transition at the end of the short leg. Thus, varieties d1 and d2 correspond to the distance at the transition to waypoint 1 and the transition to waypoint 2 as shown in FIGS. 11 and 12. Logic 206 compares the leg length LL with the sum of the lengths d1 and d2 where the distance LL represents the distance between first and second waypoints and the distance d1 or d2 is representative of the distance from a point of tangency on the circular path to a predetermined waypoint. Logic 206 enables logic 210 to set the "short" flag when the distance LL is less than the sum of distances d1 and d2, and enters a quiescent state, returning the system to the control of the prior art system of FIG. 8, when the distance LL is not less than the sum of the distances d1 and d2. The course signals are applied to generate a difference signal 212 which is representative of the angular difference between an inbound course $\psi_1$ and an outbound course $\psi_2$ and thereby compute a signal $\Delta\psi$.

Referring now to FIG. 11, which for simplicity of analysis has been oriented with the initial course in a northerly direction, and with continued reference to FIG. 10, course 230 is in a northerly direction and therefore the angle $\psi_1$ has a value of zero. Course 232 is in an easterly direction and $\psi_1'$ has a value of 90°. Thus, the difference $\Delta\psi_1$ between $\psi_1$ and $\psi_1'$ is 90°. At waypoint 2, which illustrates the more general case where the course is not oriented to north, course 234 is oriented at an angle $\psi_2$ of 135° with respect to north and the inbound course 232 with respect to way point 2 is at an angle $\psi_2'$ of 90°. Therefore the difference between the two courses $\Delta\psi_2$ has a value of 45°. Since both angles are positive, logic element 214 will calculate a value greater than zero and hence set the same flag 216. Similarly if both angles had a negative value the set same flag would be at enabled. If one of the angles has a negative value and the other a positive value, then the set opposite flag 224 would be enabled.

Consider now the state of operation wherein both the short flag 210 and the same flag 216 are enabled. Function block F14 will then be activated to calculate a new turn radius TRNEW in accordance with equation (3). The new turn radius is applied to function block F7 which then recalculates the distance d1NEW and d2NEW from the waypoint to the point of tangency d1 or d2. The parameters TRNEW and the distances d1NEW and d2NEW are then applied to function block 220 for calculating the coordinates of the new turn center with respect to the waypoint, NTCW and ETCW. FIG. 11 shows the results of this computation. A northerly course 230 is directed to waypoint 1. At waypoint 1, the course changes at 90° on course 232 to waypoint 2. At waypoint 2, the course again changes to a southeasterly direction along course 234 to waypoint 3. The values d1NEW and d2NEW are shown from the point of tangency on course 230 to waypoint 1 and from the point of tangency on course 232 to waypoint 2. Further, the calculated values of the turn center coordinates TC1 and TC2 are seen to be colocated for each of the waypoints such that the new radius TRNEW provides a curved path 236 which is tangential to each of the courses 230, 232 and 234.

Also shown on FIG. 11 is the original turn radius TR and original turn center TC. It may be seen that the original flight path, shown by line 238 and leg length d1 and path 240 and distance d2 did not result in the desired continuous curved path between the waypoints. The new value TRNEW is used to calculate NTCW and ETCW and to recalculated in the exact manner as described in the referenced U.S. Pat. No. 3,994,456.

Referring now to FIG. 12, with continued reference to FIG. 10, when the opposite flag 224 is set and the short flag 210 is set, function block F14 is enabled to calculate the new values of the turn center coordinates with respect to waypoint 2, designated as NTCNEWW2 and ETCNEWW2, corresponding to the original values of NTCW and ETCW. These values are computed as described above. When block 228 receives NTCNEWW2 and ETCNEWW2 from block 226, then function block F8 substitutes NTCNEWW2 and ETCNEWW2 for the previous values NTCW and ETCW. This is shown in FIG. 12 and results in translating the turn center of one of the circular paths so that the two paths are tangential. In FIG. 12, the notation W1 refers to the values associated with waypoint 1. As shown, a northerly course 230 extends to way point 1. An initially calculated turn radius TR1 is generated about an initial turn center TC1, with a predetermined latitude and longitude. Distance d1 is measured from the point of tangency of the circular path 232 to waypoint 1. Circular path 232 is also tangent to easterly course 234 at waypoint 2. At waypoint 2 the flight path transitions to a northeast course 236, denoted OUTCRS2. An original turn center TC2 and original turn radius TR2 are used to generate a further circular path 238 which is tangential with course 234 at distance d2 from waypoint 2 and also tangential with course 236. It may be seen that there is a serious discontinuity between the arcuate flight paths 232 and 238. By means of the computations performed in function block F14 the turn center of curve 238 is shifted to position TC2NEW which generates a new curve 240 having the radius value TR2 as associated with curve 238. Thus it may be seen that by shifting the turn center coordinates of curve 238 from position TC2 to position TC2NEW curves 232 and 238 may be made substantially tangential. Also shown in FIG. 12 are the original coordinate parameters NTCW2 and ETCW2 representative of the coordinate position of turn center TC2 in terms of its longitude and latitude with respect to waypoint 2. The values ETC2NEWW2 and NTC2NEWW2 represent the new coordinates of new turn center TC2NEW with respect to waypoint 2. The distance between turn centers parallel to course outcrs2 is denoted as TC2MOVEDIST, which also coincides with the difference in the points of tangency 242 and 244 of curves 238 and 240 with course 236. Also shown in FIG. 12 are the parameters ETC2TC2NEW and NTC2TC2NEW which represent the easterly and northerly coordinate shifts due to the translation of turn center from TC2 to TC2NEW.

It will be appreciated from the forgoing that the elements of the above described embodiments of the invention that generate the turn center, turn radius and translation parameters comprise means for generating a curved path which is tangential to the inbound and outbound courses of the waypoints. Thus the present invention achieves steering the aircraft through the transition from one waypoint leg to the next with a smooth, easily identifiable manual or automatic command. The curved path is completely predictable and therefore eliminates the excessive and oscillatory bank angles in maneuvering through the turn and keeps the aircraft in the protected air space necessitated in present day systems flying under FAA regulations. Since the invention does not delete the short leg, the transition sequencing appears normal to the pilot. Because the invention controls the aircraft to a predetermined curved path, the turns must be commanded to be in the correct direction. Further, the transition parameters are calculated so that there are no discontinuities in the defined path which minimizes and stabilizes bank angles.

While the invention has been described in its preferred embodiments it is to be understood that the words which have been used are words of description rather than limitation and that changes within the purview of the appended claims may be made without departing from the true scope and spirit of the invention in its broader aspects.

Embodiments of an invention in which an exclusive property or right is claimed are defined as follows:

1. Apparatus for transitioning an aircraft from an inbound course to an outbound course through a plurality of waypoints and including curved path means for computing a circular path from said inbound course to said outbound course tangentially thereto and having a plurality of arcuate segments, each such segment having a predetermined turn radius, said means for computing comprising:

path direction means responsive to a source of waypoint data for generating a control signal representative of a change in direction of said outbound course with respect to said inbound course, first path generation means responsive to a first state of said control signal corresponding to a change in the same direction of said inbound and outbound courses, for generating a further turn radius for said circular path, a turn center coordinate for said circular path, and a distance representative of the length from the point of tangency of said inbound course to a first waypoint, such that said circular path is tangential to said inbound and outbound courses irrespective of the distance between said first waypoint and a second waypoint, and second path generation means responsive to a second state of said control signal corresponding to a change in an opposite direction of said inbound and said outbound courses for generating at least first and second turn center coordinate signals such that said circular path is tangential to said inbound and outbound courses irrespective of said distance between said first and second waypoints.

2. The apparatus as set forth in claim 1 in which said path direction means comprises:

means for computing a distance LL representative of the distance between first and second waypoints, means for computing a distance d representative of the distance from a point of tangency of said circular path to a predetermined waypoint, and means for comparing said distance LL with said distance d such that said first or second state of said control signal is enabled when said distance LL is less than said distance d and a quiescent state of said control signal is enabled when said distance LL is not less than said distance d.

3. The apparatus as set forth in claim 2, wherein said distance d further comprises a first distance d1 representative of the distance to said first waypoint from a first point of tangency on said inbound course and a distance d2 representative of the distance to said second waypoint from a second point of tangency between said first and second waypoints on a segment of said outbound course.

4. The apparatus as set forth in claim 3, wherein said path direction means further comprises means responsive to a difference signal representative of the angular difference between said inbound and outbound courses, and means for computing a first signal representative of an angular difference between a first course and a second course and a second signal representative of an angular difference between said second course and a third course.

5. The apparatus as set forth in claim 4 wherein said path direction means comprises means for computing an angular product function of the form:

$$\Delta\psi_1 * \Delta\psi_2$$

wherein $\Delta\psi_1$ is an angular difference between first and second courses, $\Delta\psi_2$ is an angular difference between second and third courses.

6. The apparatus as set forth in claim 5 wherein said path direction means further comprises means for comparing said angular product function with a value of zero, said first state of said control signal being enabled when said function has a value greater than zero and said second state being enabled when said function is not greater than zero.

7. The apparatus as set forth in claim 6, wherein said first state of said control signal is generated when said means for comparing said distances LL and d enables said first state and said angular product function also enables said first state.

8. The apparatus as set forth in claim 7, said means for generating a further turn radius comprising means for generating the function $$TRNEW = \frac{LL}{|\tan\Delta\psi_1 + \tan\Delta\psi_2|}$$

where TRNEW is said further turn radius, leg length LL is the distance between two waypoints defining a short leg, $\Delta\psi_1$ is an angular difference between first and second courses, $\Delta\psi_2$ is an angular difference between second and third courses.

9. The apparatus as set forth in claim 8 wherein said means for generating a turn center for said circular path comprises means for applying said further turn radius TRNEW to compute a north component NTCW of said turn center coordinate and an east component ETCW of said turn center coordinate for said circular path.

10. The apparatus as set forth in claim 9 further comprising means for applying said turn radius TRNEW to compute said distance d1 from said first point of tangency of said circular path to said first waypoint.

11. The apparatus as set forth in claim 10 wherein a first turn center corresponding to first and second waypoints and a second turn center corresponding to second and third waypoints coincide, so that a circle of radius TRNEW is tangential to inbound and outbound courses passing through said first, second, and third waypoints, irrespective of said distance LL.

12. The apparatus as set forth in claim 6 wherein said second state of said control signal is generated when enabled by said means for comparing said distance LL and distance d when said distance d exceeds said distance LL and further enabled by said angular product function having a value not greater than zero.

13. The apparatus as set forth in claim 12 wherein said second path generator means is responsive to applied navigation signals representative of a waypoint latitude and longitude, turn radius, north coordinate NTCW and an east coordinate ETCW of a predetermined circular path, and means for computing the functions NTCNEWW2 and ETCNEWW2, said functions representative of turn center coordinates for a further circular path defining said turn radius such that said predetermined circular path and said further circular path are tangential to said inbound and outbound courses through said plurality of waypoints.

14. The apparatus as set forth in claim 13, wherein said tangential path is further comprised of the function $$TC2MOVEDIST = \frac{DTC1TC2 - (TR1 + TR2)}{COS(ATC1TC2 - OUTCRS2)}$$

where TC2MOVEDIST comprises the distance between a first turn center TC2 for generating a first circular path with respect to a given waypoint and a second turn center TC2NEW corresponding to said further circular path, DTC1TC2 is a distance between said turn center TC2 and a turn center TC1 of said predetermined circular path, TR1 is a turn radius for said predetermined circular path, TR2 is a turn radius for said first circular path and said further circular path, ATC1TC2 is an angle defined by a line corresponding to said distance DTC1TC2 and an East-West coordinate, and OUTCRS2 is the angle of said outbound course with respect to said given waypoint.

15. A method for generating a flight path tangential to an inbound course and an outbound course and proximate to an intermediate course therebetween, said flight path comprising at least one course change between a plurality of waypoints, comprising:

providing navigational data including the angular position of said inbound course, outbound course, and intermediate course with respect to first or second waypoints, and the longitudinal distance between said waypoints, said distance defining a leg length, defining a first circular path tangential to said inbound and intermediate courses, computing a first distance from the point of tangency of said circular path and said inbound course to said first waypoint, defining a second circular path tangential to said intermediate course and said outbound course, computing a second distance from the point of tangency of said second circular path and said intermediate course to said second waypoint, comparing said leg length with said first and second distances wherefrom to provide a control flag corresponding to a predetermined condition of said leg length such that said first and second circular courses are not tangential said intermediate course, comparing said angular positions with a predetermined value thereof wherefrom to determine the direction of a change between said inbound, intermediate, and outbound courses, applying said leg length and said angular positional data to compute a turn radius and turn center for a further circular path tangential to said inbound, intermediate, and outbound courses responsive to said direction of change for a first predetermined change in course direction, providing further navigational data corresponding to the geographic locations of said first and second waypoints, applying said further navigational data to compute a predetermined turn radius and predetermined turn center corresponding to said second circular path, a displacement of said predetermined turn center of said second circular path from said turn center of said first circular path, and a further turn center of said second circular path corresponding to said predetermined turn radius thereof, so that said further turn center defines a portion of said flight path tangential to said intermediate course and said outbound course for a second predetermined change in course direction.

* * * * *